(12) United States Patent
Chang

(10) Patent No.: US 7,740,388 B2
(45) Date of Patent: *Jun. 22, 2010

(54) OPTICAL PLATE AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 198 days.

This patent is subject to a terminal disclaimer.

(21) Appl. No.: 11/957,420

(22) Filed: Dec. 15, 2007

(65) Prior Publication Data
US 2009/0021958 A1 Jan. 22, 2009

(30) Foreign Application Priority Data
Jul. 20, 2007 (CN) .................... 2007 1 0201139

(51) Int. Cl.
*F21V 7/04* (2006.01)
(52) U.S. Cl. .................... 362/606; 362/97.1; 362/333
(58) Field of Classification Search ............... 362/600, 362/602, 606, 617, 620, 330
See application file for complete search history.

(56) References Cited

U.S. PATENT DOCUMENTS 5,839,823 A * 11/1998 Hou et al. ............... 362/327
6,259,854 B1 * 7/2001 Shinji et al. ............. 385/146
6,964,497 B2 * 11/2005 Greiner ................... 362/241
7,081,933 B2 * 7/2006 Yu et al. .................. 349/62

* cited by examiner

*Primary Examiner*—Ali Alavi
(74) *Attorney, Agent, or Firm*—Frank R. Niranjan

(57) ABSTRACT

An exemplary optical plate includes a plurality of transparent plate units. The transparent plate unit includes a first surface, a second surface, a plurality of conical frustum protrusions, a diffusion layer and a lamp-receiving portion. The second surface is opposite to the first surface. The conical frustum protrusions are formed at the first surface. Each conical frustum protrusion comprises two conical frustums. The diffusion layer is formed at the second surface. The lamp-receiving portion is defined in one of the first surface and the second surface. A backlight module using the optical plate is also provided.

20 Claims, 15 Drawing Sheets

US 7,740,388 B2

OPTICAL PLATE AND BACKLIGHT MODULE USING THE SAME

CROSS-REFERENCE TO RELATED APPLICATIONS

This application is related to twenty-one co-pending U.S. patent applications, which are: published serial no. 2008/0259636, published serial no. 2008/0259637, published serial no. 2008/0259638, published serial no. 2008/0259639, published serial no. 2008/0266895, U.S. Pat. No. 7,556,417, and published serial no. 2008/0266901, filed on Aug. 8, 2007, and all entitled "OPTICAL PLATE AND BACKLIGHT MODULE USING THE SAME", published serial no. 2008/0266872 filed on August 10, and entitled "OPTICAL PLATE AND BACKLIGHT MODULE USING THE SAME", U.S. Pat. No. 7,458,714, filed on Aug. 21, 2007, and entitled "OPTICAL PLATE AND BACKLIGHT MODULE USING THE SAME", U.S. Pat. No. 7,422,357 and published serial no. 2008/0266898, filed on Aug. 23, 2007, and both entitled "OPTICAL PLATE AND BACKLIGHT MODULE USING THE SAME", published serial no. 2008/0266874, filed on Aug. 27, 2007, and entitled "OPTICAL PLATE AND BACKLIGHT MODULE USING THE SAME", published serial no. 2008/0266875, serial no. 2008/0266876, serial no. 2008/0266877, and serial no. 2008/0266878, filed on Aug. 28, 2007, all entitled "OPTICAL PLATE AND BACKLIGHT MODULE USING THE SAME", and published serial no. 2008/0266896 and serial no. 2008/0266879, filed on Sep. 5, 2007, both entitled "OPTICAL PLATE AND BACKLIGHT MODULE USING THE SAME", published serial no. 2008/0278818, and serial no. 2009/0010024, filed on Sep. 26, 2007, both entitled "OPTICAL PLATE AND BACKLIGHT MODULE USING THE SAME", and published serial no. 2009/0021947 filed on December 3, and entitled "OPTICAL PLATE AND BACKLIGHT MODULE USING THE SAME". In all the co-pending applications except published serial no. 2008/0266875, the inventor is Shao-Han Chang. In published serial no. 2008/0266875, the inventors are Shao-Han Chang and Fen Chen. All of the co-pending applications have the same assignee as the present application.

BACKGROUND OF THE INVENTION

1. Field of the Invention

The present invention relates to an optical plate for use in, for example, a backlight module, the backlight module typically being employed in a liquid crystal display (LCD).

2. Discussion of the Related Art

In a liquid crystal display device, liquid crystal is a substance that does not itself illuminate light. Instead, the liquid crystal relies on light received from a light source, in order for the liquid crystal to display information. In the case of a typical liquid crystal display device, a backlight module powered by electricity supplies the needed light.

FIG. 15 represents a typical direct type backlight module 100. The backlight module 100 includes a housing 101, a light reflective plate 102, a light diffusion plate 103, a prism sheet 104, and a plurality of light emitting diodes 105 (hereinafter called LED). The housing 101 includes a rectangular base 1011 and four sidewalls 1013 extending from a periphery of the base 1011. The base 1011 and the four sidewalls 1013 cooperatively define a chamber 1017. Each LED 105 includes a base portion 1053 and a light-emitting portion 1051 disposed on the base portion 1053. The LEDs 105 are electrically connected to a printed circuit board 107, and the printed circuit board 107 is fixed to the base 1011 of the housing 101.

The light reflective plate 102 is disposed on the LEDs 105 in the chamber 1017. The light reflective plate 102 defines a plurality of through holes (not labeled) that allows the light-emitting portions 1051 of the LED 105 to pass through and to emit light to be transmitted to the light diffusion plate 103. The light diffusion plate 103 and the prism sheet 104 are stacked in that order on the chamber 1017. Light emitted from the LEDs 105 is substantially reflected by the light reflective sheet 102 to enter the light diffusion plate 103, and diffused uniformly in the light diffusion plate 103, and finally surface light is outputted from the prism sheet 104.

Generally, a plurality of dark areas may occur because of a reduced intensity of light between adjacent LEDs 105. In the backlight module 100, each LED 105 further includes a reflective sheet 106 disposed on the top of the light-emitting portion 1051, configured for decreasing the brightness of a portion of the backlight module 100 above the LED 105. However, the brightness of the backlight module 100 is still non-uniform. One method of enhancing the uniformity of brightness of the backlight module 100 is to increase the space between the light diffusion plate 103 and the LEDs 105. This increase in space tends to eliminate dark areas. However, increasing the space between the diffusion plate 103 and the LEDs 105 will also increase the thickness of the backlight module 100, and the further overall intensity of the output light rays is reduced.

What is needed, therefore, is a new optical plate and a backlight module using the optical plate that can overcome the above-mentioned shortcomings.

SUMMARY

An optical plate according to a preferred embodiment includes a plurality of transparent plate units. The transparent plate unit includes a first surface, a second surface, a plurality of conical frustum protrusions, a diffusion layer and a lamp-receiving portion. The second surface is opposite to the first surface. The conical frustum protrusions are formed at the first surface. Each conical frustum protrusion comprises two conical frustums. The diffusion layer is formed at the second surface. The lamp-receiving portion is defined in one of the first surface and the second surface.

A backlight module according to a preferred embodiment includes a housing, a point light source, a reflective member, an optical plate, and a light diffusion plate. The housing includes a base and a plurality of sidewalls extending from a periphery of the base, the base and the sidewalls cooperatively forming an opening. The point light source is disposed on the base, each point light source having a light-emitting portion. The reflective member disposed on the top of the light-emitting portion of the point light source. The same optical plate as described in the previous paragraph is employed in this embodiment. The light-emitting portion of the point light source is inserted in the lamp-receiving portion of the optical plate correspondingly. The light diffusion plate is disposed on the housing over the opening.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
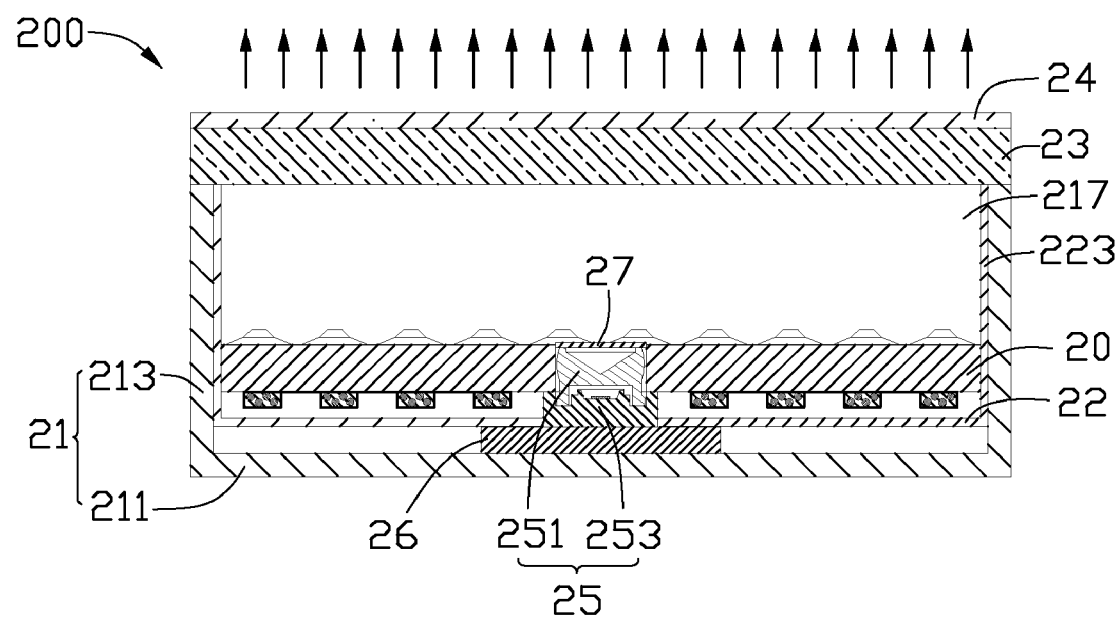
FIG. 1 is a side cross-sectional view of a backlight module using an optical plate according to a first preferred embodiment of the present invention.
Figure 2:
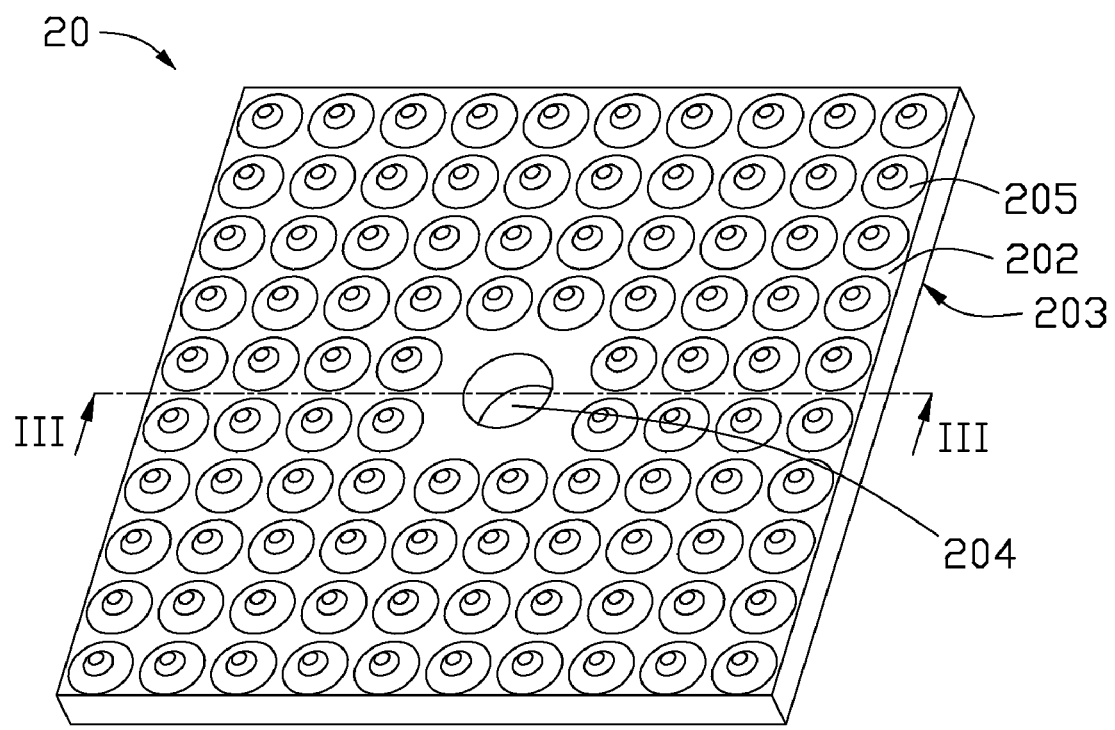
FIG. 2 is an isometric view of the optical plate of FIG. 1.
Figure 3:
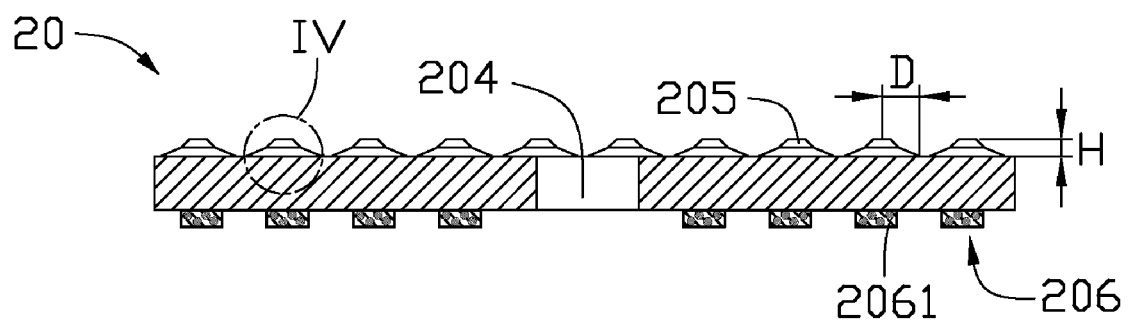
FIG. 3 is a cross-sectional view taken along line III-III of FIG. 2.
Figure 4:
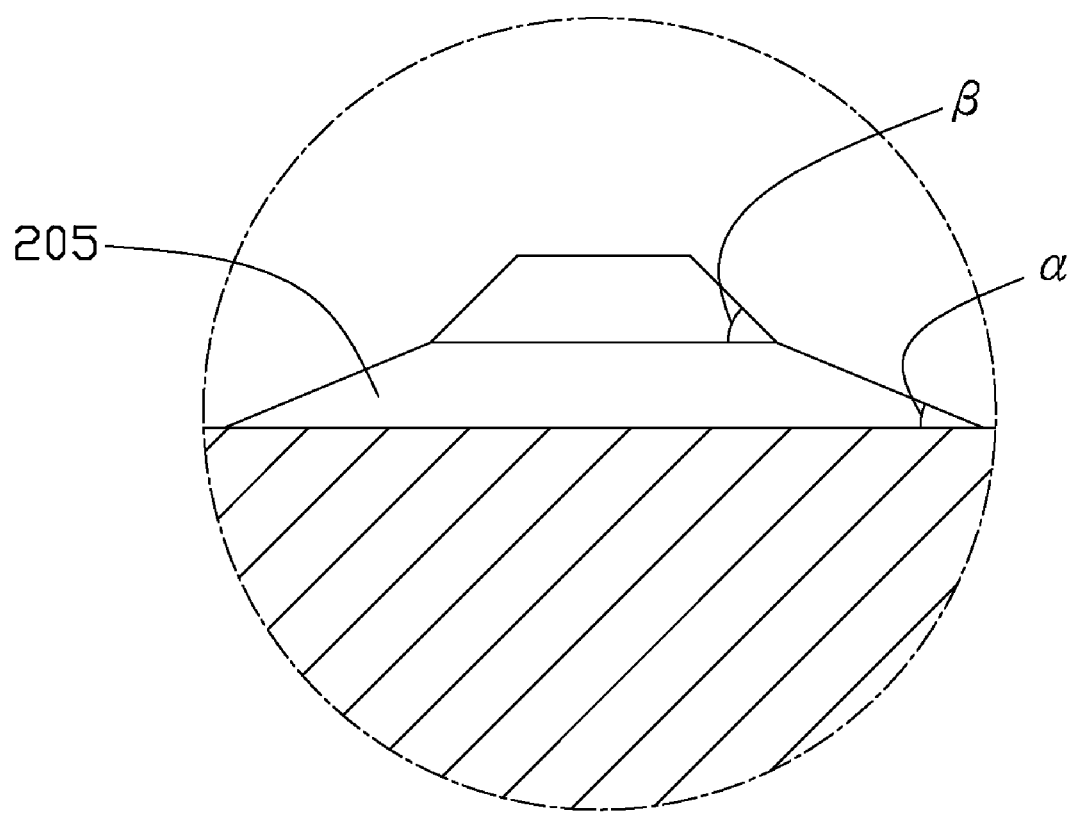
FIG. 4 is an enlarged view of a circled portion IV of FIG. 3.
Figure 5:
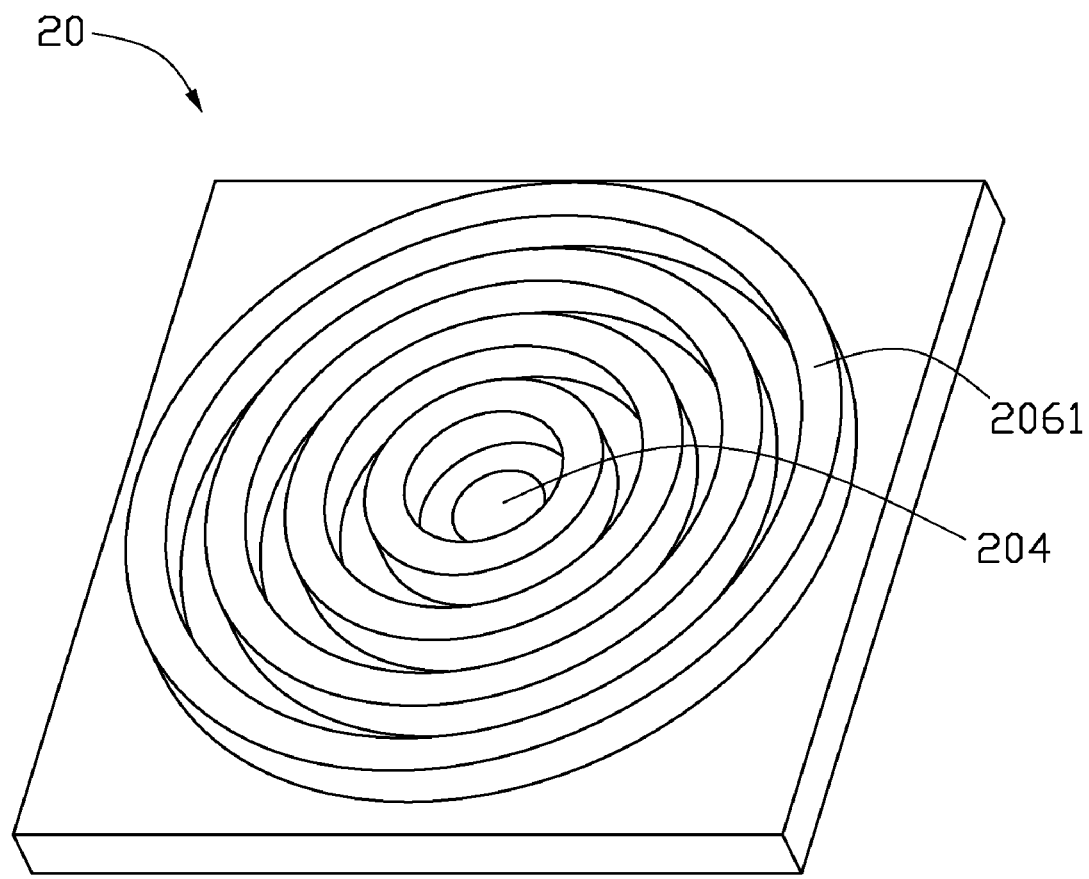
FIG. 5 is similar to FIG. 2, but viewed from another aspect.

Referring to FIG. 1, a backlight module 200 in accordance with a first preferred embodiment is shown. The backlight module 200 includes a housing 21, a light reflective plate 22, a light diffusion plate 23, a LED 25, a reflective member 27, and an optical plate 20. The housing 21 includes a rectangular base 211 and four sidewalls 213 extending around a periphery of the base 211. The sidewalls 213 cooperatively define an opening 217. The light diffusion plate 23 is disposed on the housing 21 atop the opening 217. The optical plate 20, the light reflective plate 22, and the LED 25 are received in the housing 21.

Referring to FIGS. 2 through 5, the optical plate 20 is a transparent square plate. The optical plate 20 includes a light output surface 202, and a bottom surface 203 on opposite side of the light output surface 202 of the optical plate 20. A plurality of conical frustum protrusions 205 are formed on the light output surface 202. A diffusion layer 206 is formed on the bottom surface 203. The optical plate 20 further includes a lamp-receiving portion 204 defined in a center of the bottom surface 203. In this embodiment, the lamp-receiving portion 204 is a through hole communicating between the light output surface 202 and the bottom surface 203. The optical plate 20 is made from a material selected from a group consisting of polycarbonate (PC), polymethyl methacrylate (PMMA), polystyrene (PS), copolymer of methylmethacrylate and styrene (MS), and any suitable combination thereof.

The conical frustum protrusions 205 are distributed on the light output surface 202 in a matrix manner surrounding the lamp-receiving portion 204 at the light output surface 202. In the illustrated embodiment, each of the conical frustum protrusions 205 includes a first conical frustum and a second conical frustum aligned at a center axis and stacked together. In each conical frustum protrusion 205, an angle α defined between a conical surface of a first conical frustum relative to a base of the first conical frustum is equal to or smaller than an angle β defined between a conical surface of the second conical frustum relative to a second conical frustum. Each of the angles α,β is larger than zero, and equal to or smaller than 60 degrees. In addition, a radius D of a base of each conical frustum protrusion 205 is configured to be in a range from about 0.02 millimeters to about 4 millimeters. A height H of each conical frustum protrusion 205 is configured to be in a range from about 0.01 millimeters to about 3 millimeters.

Referring to FIG. 5 again, the diffusion layer 206 is composed of a plurality of circular walls 2061 arranged apart. Centers of the circular walls 2061 of the diffusion layer 206 can be aligned at a mid-point of the lamp-receiving portion 204 of the optical plate 20. A radial thickness of each of the circular walls 2061 is the same and a distance between adjacent circular walls 2061 is also the same. The diffusion layer 206 includes transparent resin matrix material, and diffusion particles uniformly dispersed in the transparent resin matrix material. The diffusion layer 206 is manufactured by solidifying an ink layer that is coated on the bottom surface 203. The ink layer includes a varnish and a plurality of diffusion particles dispersed in the varnish. The varnish is preferably acrylic varnish. The transparent resin matrix material is made of acrylic from the varnish. The diffusion particles are selected from a group consisting of glass beads, silicon dioxide ($SiO_2$) particles, PMMA particles, and any combination thereof.

Referring to FIG. 1 again, the LED 25 includes a base portion 253, and a light-emitting portion 251 disposed on the base portion 253. The LED 25 is electrically connected to a printed circuit board 26 that is fixed to the base 211 of the housing 21. In this embodiment, the reflective member 27 is a light reflective sheet positioned on the top of the light-emitting portion 251. The optical plate 20 is positioned in the housing 21 such that the lamp-receiving portion 204 of the optical plate 20 receives the light-emitting portion 251 of the LED 25 with the reflective member 27. The light output surface 202 of the optical plate 20 faces the opening 217. The light reflective plate 22 defines a through hole (not labeled). The light reflective plate 22 is disposed on the bottom surface 203 of the optical plate 20 with the LED 25 partially protruding through the light reflective plate 22 via the through hole.

Light emitted from the light-emitting portion 251 of the LED 25 enters the optical plate 20 via an inner surface of the lamp-receiving portion 204. A significant amount of light enters the optical plate 20. Since the diffusion layer 206 is formed on the bottom surface 203, a great amount of light can be diffused in the diffusion layer 206 before exiting from the backlight module 200, thus optical uniformity of backlight module 200 can be improved. In addition, the conical frustum protrusions 205 can condense and collimate emitted light, thereby improving a brightness of the backlight module 200.

Furthermore, because the LED 25 is positioned in the lamp-receiving portion 204, light uniformly exit the light output surface 202 of the optical plate 20, however, a portion above the LED 25 has a relatively low light output. Light exiting the optical plate 20 can be further substantially mixed in a chamber between the optical plate 20 and the light diffusion plate 23, and finally uniform surface light is outputted from the light diffusion plate 23. A distance from the LED 25 to the light diffusion plate 23 may be configured to be very small, with little or no risk of having dark areas on the portion of the backlight module 200 directly above the LED 25. Accordingly, the backlight module 200 can have a compact configuration while still providing good, uniform optical performance.

It should be pointed out that, the light reflective plate 22 can be omitted. In an alternative embodiment, a high reflectivity film can be deposited on an inner surface of the base 211 and the sidewalls 213 of the housing 21. In another alternative embodiment, the housing 21 is made of metal materials, and has high reflectivity inner surfaces.

It is to be understood that, in order to improve brightness of the backlight module 200 within a specific viewing range, the backlight module 200 can further include a prism sheet 24 disposed on the light diffusion plate 23. In addition, in order to improve the light energy utilization rate of the backlight module 200, there is further four reflective sidewalls 223 can be further added extending around a periphery of the light reflective plate 22 and in contact with the corresponding sidewalls 213 of the housing 21.

Figure 6:
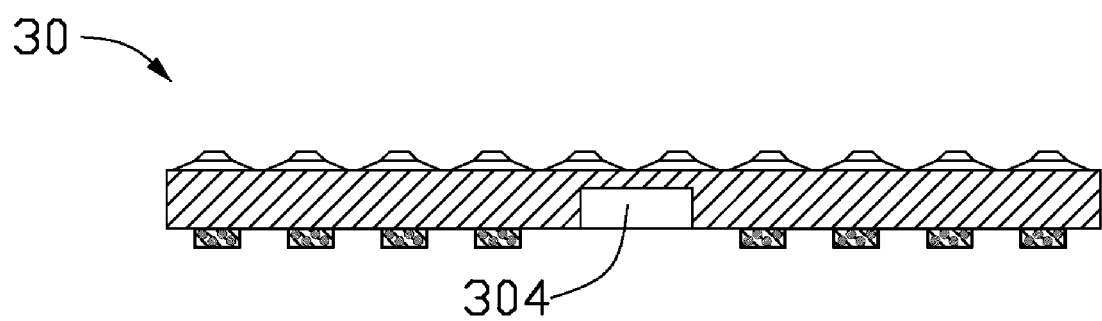
FIG. 6 is an isometric view of an optical plate according to a second preferred embodiment of the present invention.

Referring to FIG. 6, an optical plate 30 in accordance with a second preferred embodiment is shown. The optical plate 30 is similar in principle to the optical plate 20 of the first preferred embodiment, except that a lamp-receiving portion 304 of the optical plate 30 is a blind hole. It should be pointed out that, a reflective member (not shown) can be also positioned on a center of the optical plate 30 above the lamp-receiving portion 304.

Figure 7:
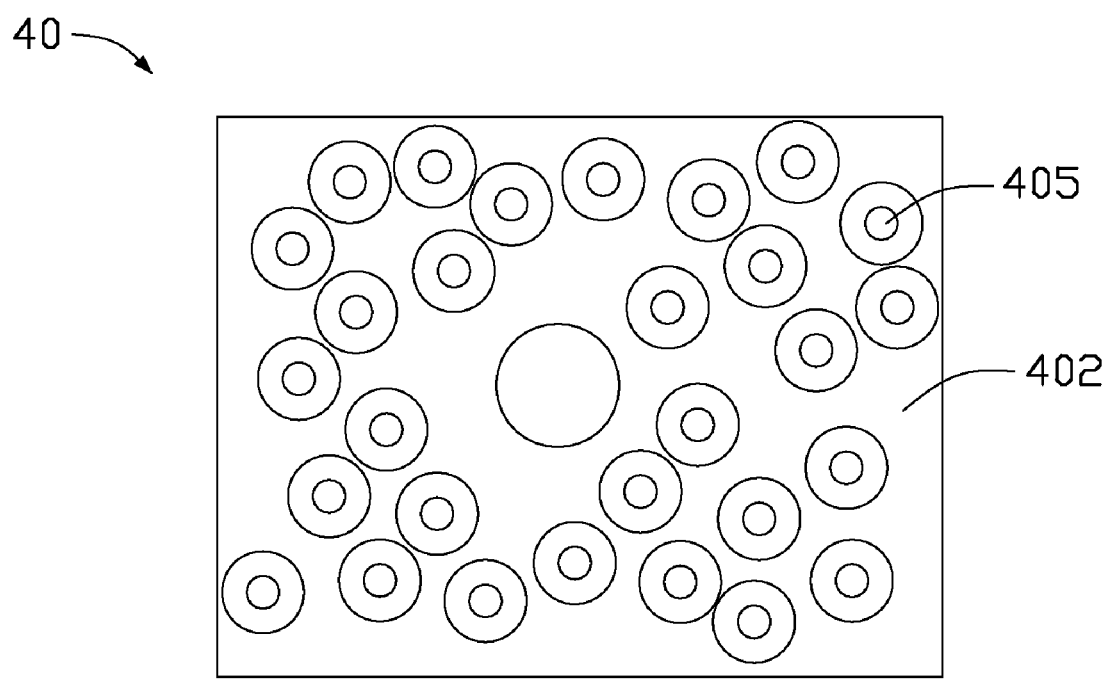
FIG. 7 is a top plane view of an optical plate according to a third preferred embodiment of the present invention.

Referring to FIG. 7, an optical plate 40 in accordance with a third preferred embodiment is shown. The optical plate 40 is similar in principle to the optical plate 20, except that conical frustum protrusions 405 of the optical plate 40 are distributed on a light output surface 402 in a random manner. This configuration of the optical plate 40 is easy to be manufactured.

Figure 8:
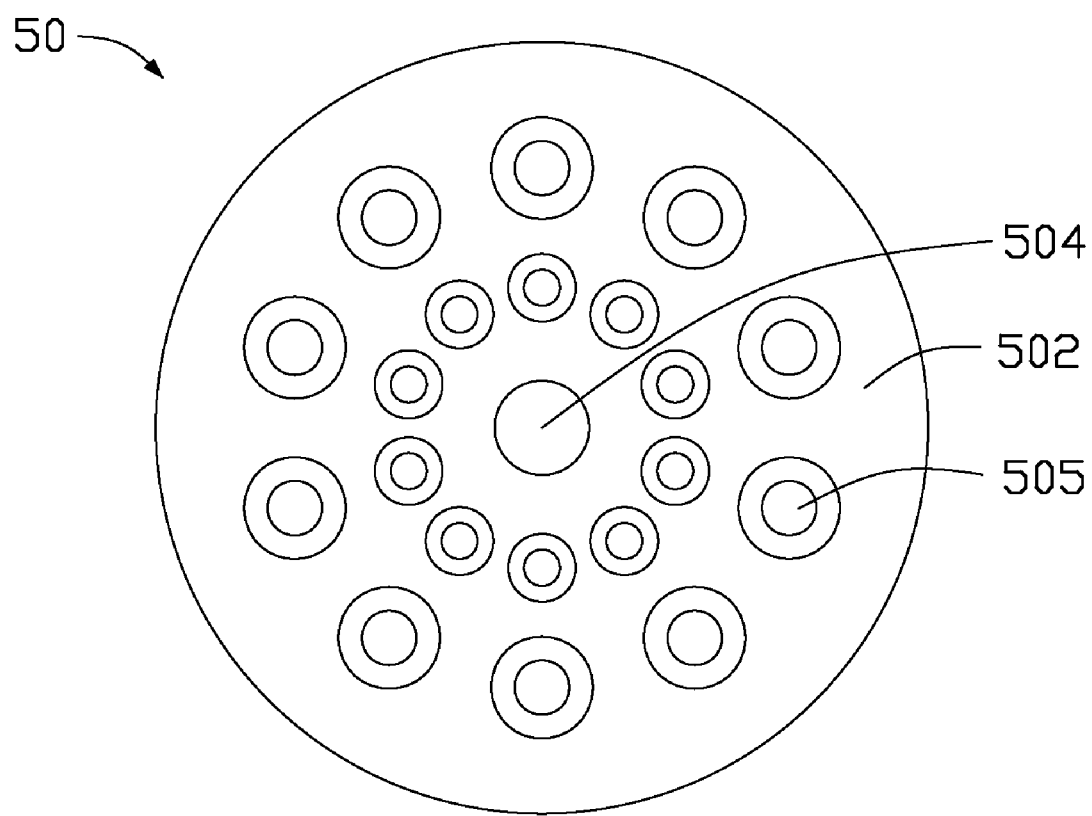
FIG. 8 is a top plane view of an optical plate according to a fourth preferred embodiment of the present invention.

Referring to FIG. 8, an optical plate 50 in accordance with a fourth preferred embodiment is shown. The optical plate 50 is similar in principle to the optical plate 20, except that conical frustum protrusions 505 are distributed radially on the light output surface 502 in a symmetric manner with respect to a lamp-receiving portion 504. A diameter of a base of each of the conical frustum protrusions 505 increases with increasing distance from the lamp-receiving portion 504. The optical plate 50 of this configuration may have a relatively good uniformity of light output.

It should be noted that, in the backlight module 200, not only can the optical plate 20 can be positioned in the housing 21 with the light output surface 202 facing the light diffusion plate 23, but can also be positioned in the housing 21 with the bottom surface 203 facing the light diffusion plate 23. That is, the square protrusions 205 are formed on a first surface of the optical plate 20, and the diffusion layer 206 is formed at a second surface of the optical plate 20. The first surface is selected from one of the light output surface 202 and the bottom surface 203, and the second surface is selected from another one of the light output surface 202 and the bottom surface 203.

Furthermore, in order to increase brightness of light illumination provided by the backlight module, or mix different wavelengths of light generated by different light emitting diodes to produce white light, a plurality of transparent plate units can be combined with each other to form a combined optical plate, and the different light emitting diodes can be inserted into the lamp-receiving portions of the combined optical plate correspondingly.

In order to improve the light optical uniformity of backlight module 200 further, the diffusion layer 206 of optical plate 20 can be distributed in other patterns as shown in FIGS. 9 through 14.

Figure 9:
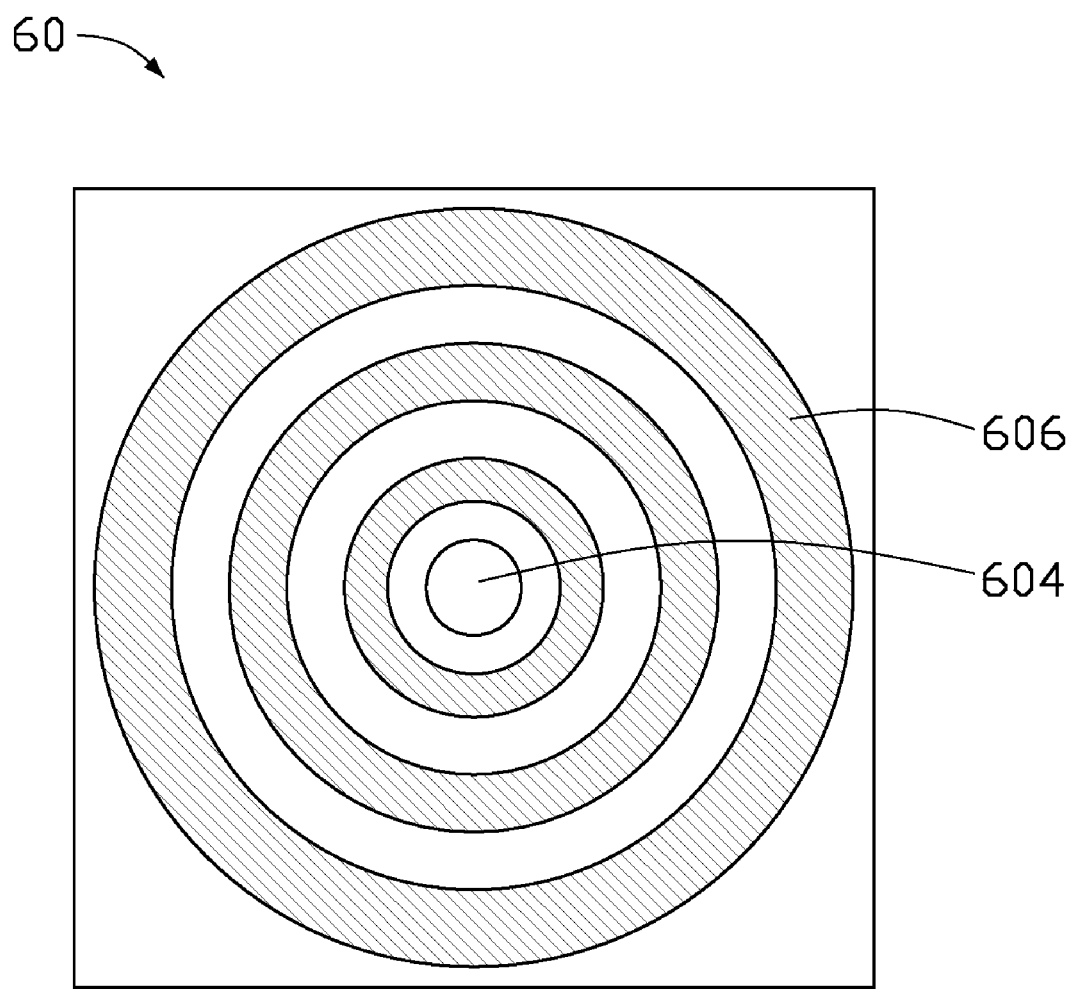
FIGS. 9 through 14 are top plan views of distributions of diffusion layer of the optical plate of the present invention.

Referring to FIG. 9, a distribution design of a diffusion layer is described below. A diffusion layer 606 of an optical plate 60 is composed of three (or more) substantially circular walls arranged apart. Centers of the three circular walls of the diffusion layer 606 can be aligned at a mid-point of the lamp-receiving portion 604 of the optical plate 60. Furthermore, a radial thickness of each of the circular walls increases along a direction away from the lamp-receiving portion 604.

Figure 10:
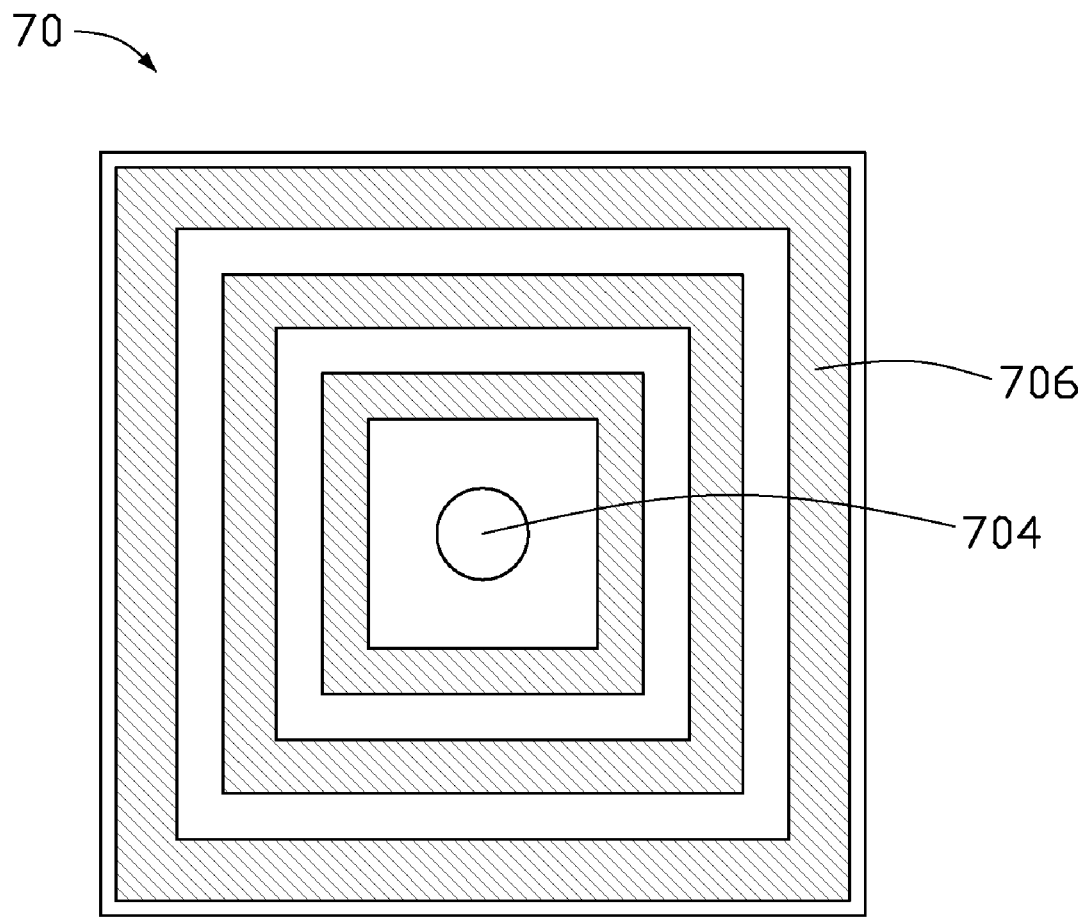

Referring to FIG. 10, a distribution design of a diffusion layer is described below. A diffusion layer 706 of an optical plate 70 is composed of three (or more) substantially square walls arranged apart. The center of the lamp-receiving portion 704 and the points made by the intersections of the diagonals of the square walls of the diffusion layer 706 are collinear. Furthermore, a radial thickness of each of the square walls increases along a direction away from the lamp-receiving portion 704.

Figure 11:
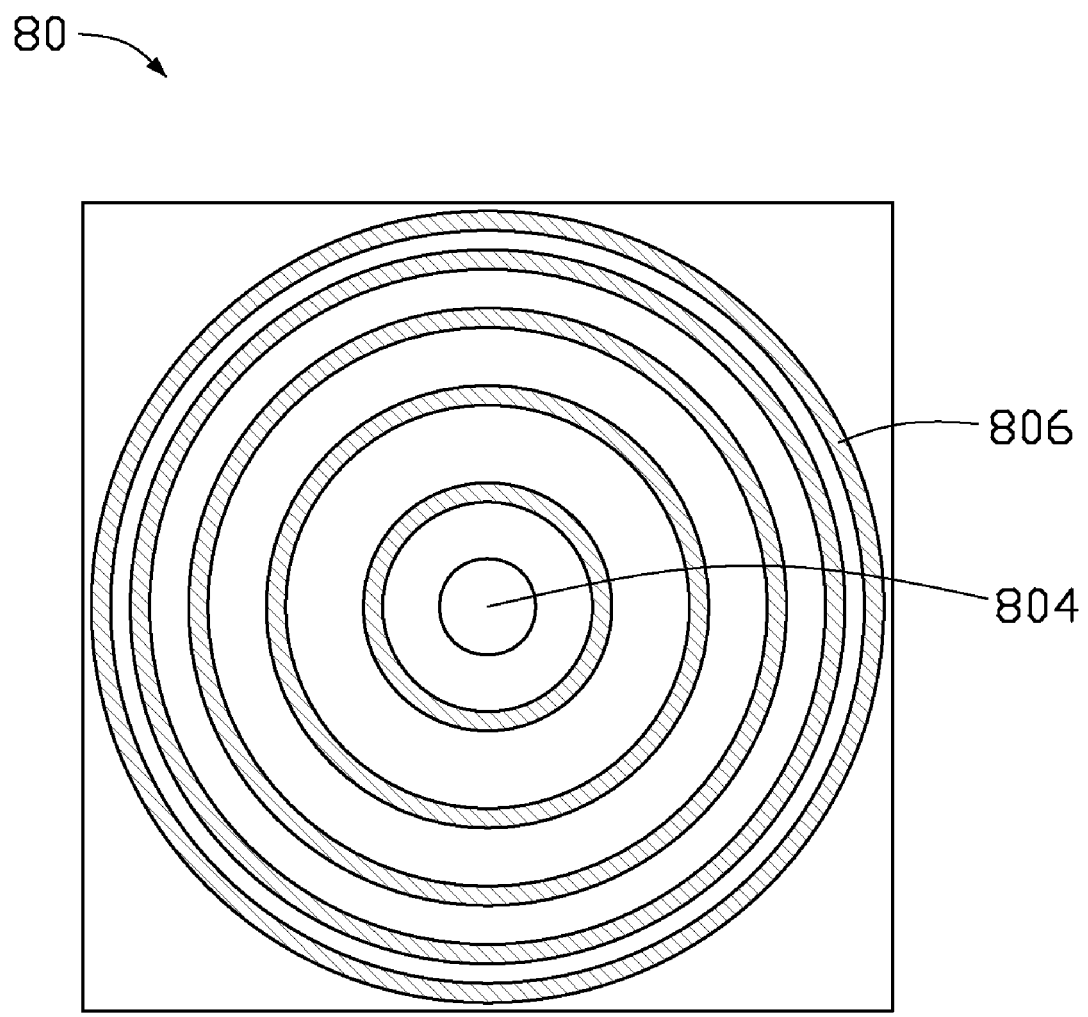

Referring to FIG. 11, a distribution design of a diffusion layer is described below. A diffusion layer 806 of an optical plate 80 is composed of five (or more) substantially circular walls arranged apart. Centers of the five circular walls of the diffusion layer 806 can be aligned at a mid-point of the lamp-receiving portion 804 of the optical plate 80. Furthermore, a radial thickness of each of the circular walls is the same, and a distance between two adjacent circular walls increases along a direction away from the lamp-receiving portion 804.

Figure 12:
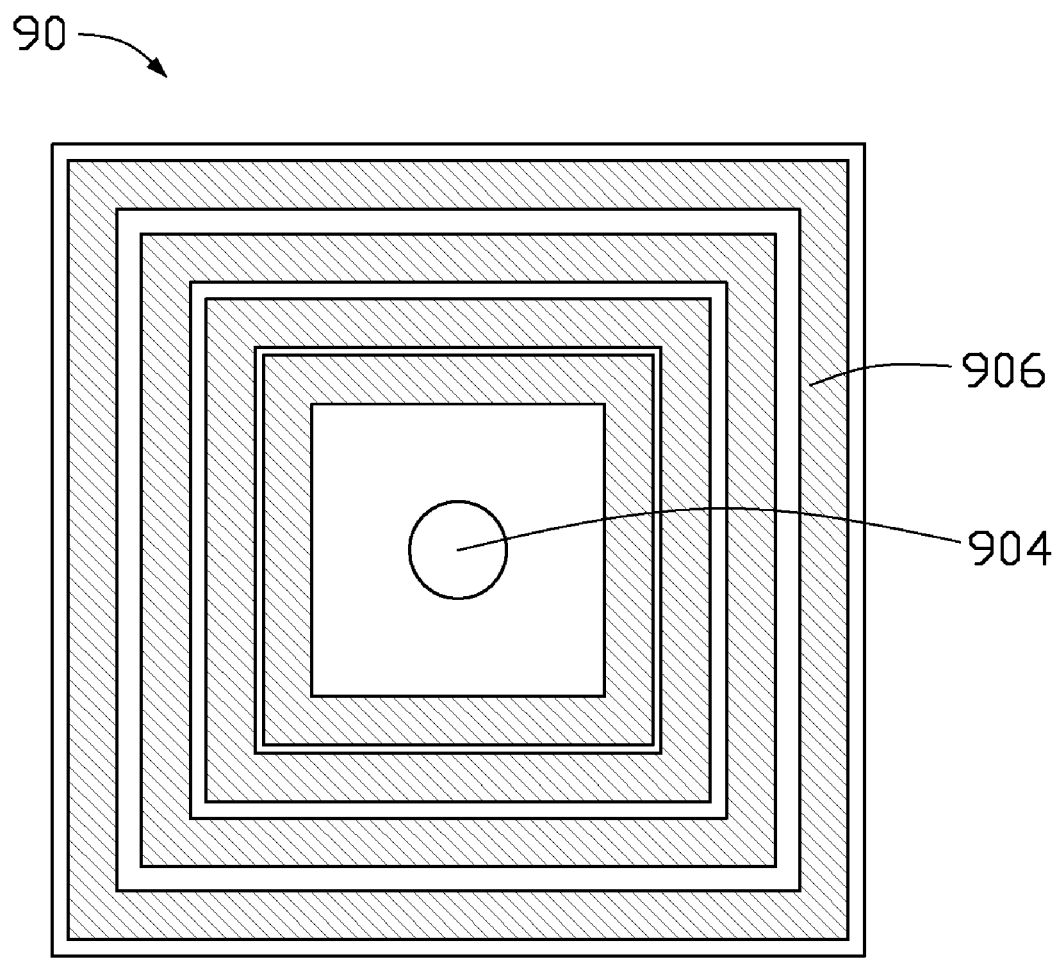

Referring to FIG. 12, a distribution design of a diffusion layer is described below. A diffusion layer 906 of an optical plate 90 is composed of four (or more) substantially square walls arranged apart. The center of the lamp-receiving portion 904 and the points made by the intersections of the diagonals of the square walls of the diffusion layer 906 are collinear. Furthermore, a radial thickness of each of the square walls is the same, and a distance between two adjacent square walls increases along a direction away from the lamp-receiving portion 904.

Figure 13:
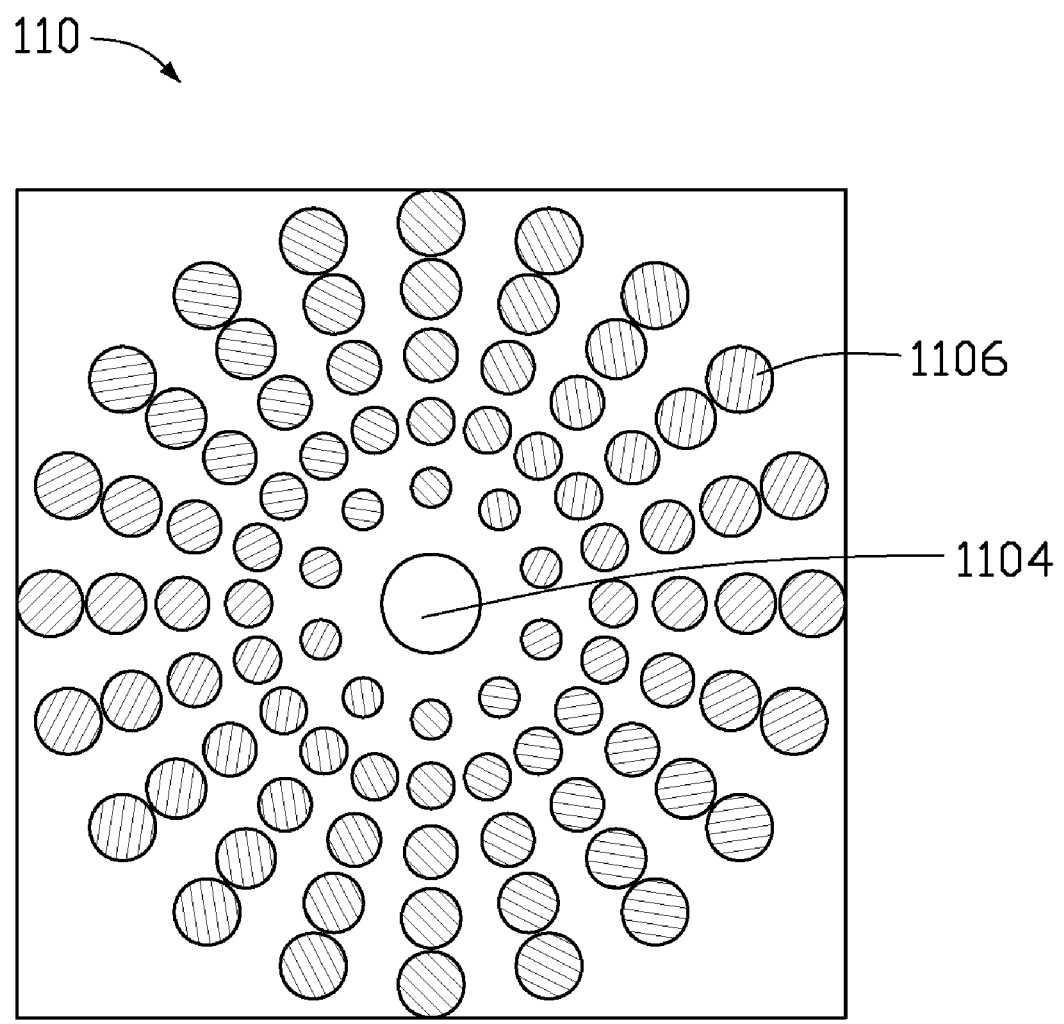

Referring to FIG. 13, a distribution design of a diffusion layer is described below. A diffusion layer 1106 of an optical plate 110 is composed of a plurality of circular dots. The circular dots are arranged radially from a lamp-receiving portion 1104 of the optical plate 110. Sizes of the circular dots at different distance away from the lamp-receiving portion 1104 are different. The sizes and the densities of the circular dots increase as a distance of the circular dots from the lamp-receiving portion 1104.

Figure 14:
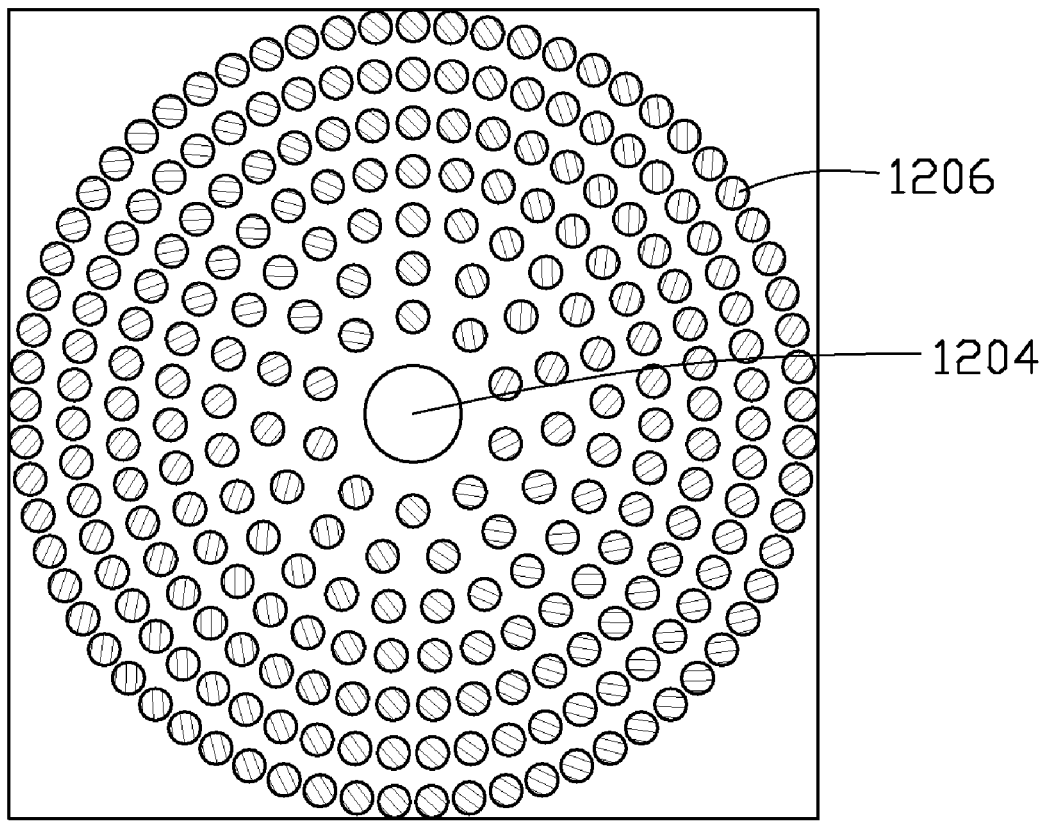
Figure 15:
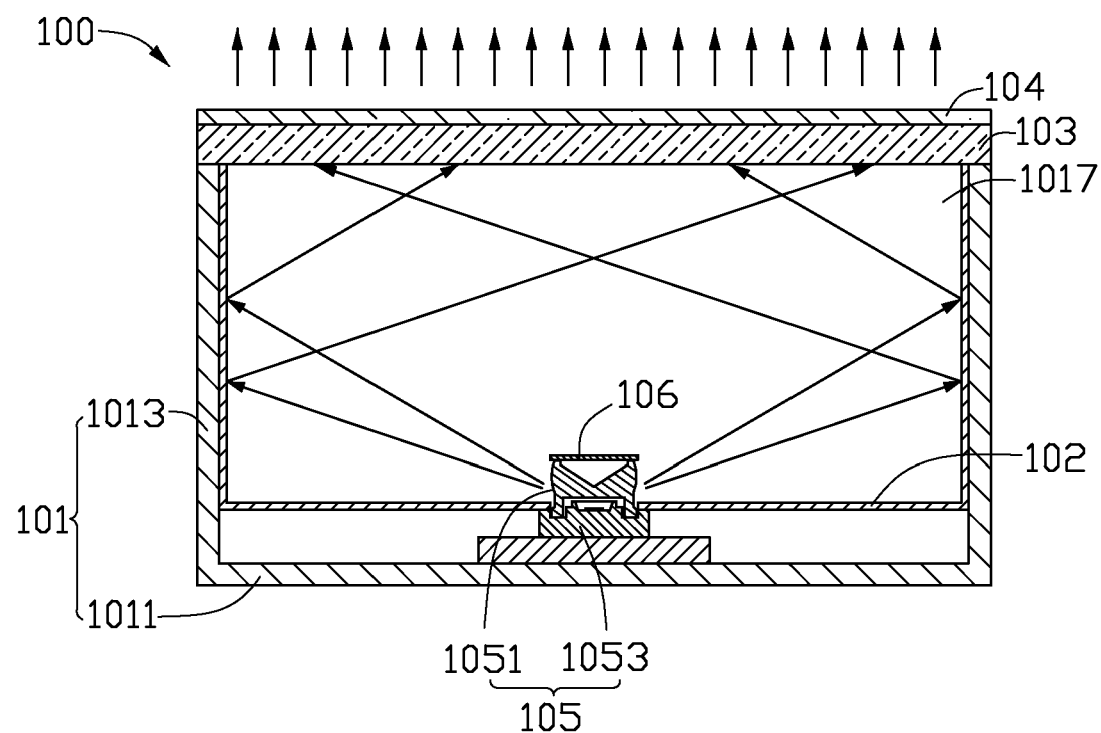
FIG. 15 is a side cross-sectional view of a conventional backlight module.

Referring to FIG. 14, a distribution design of a diffusion layer is described below. A diffusion layer 1206 of an optical plate 120 is composed of a plurality of circular dots. The circular dots are substantially identical to each other. The circular dots are arranged separately along a plurality of imaginary circles that have a same center. Centers of the imaginary circles are also the center of a lamp-receiving portion 1204 of the optical plate 120. Furthermore, the densities of circular dots of each imaginary circle can increase along a direction away from the lamp-receiving portion 1204.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
   at least one transparent plate unit having:
   a first surface;
   a second surface opposite to the first surface;
   a plurality of conical frustum protrusions formed on the second surface; and
   at least a lamp-receiving portion defined in at least one of the first surface and the second surface; and
   a diffusion layer formed on the second surface.

2. The optical plate according to claim 1, wherein each conical frustum protrusion is a stacked conical frustum protrusion.

3. The optical plate according to claim 2, wherein the stacked conical frustum protrusion has a first conical frustum and a second conical frustum, the second conical frustum positioned on top of the first conical frustum, an angle defined between a conical surface of the first conical frustum relative to a base of the first conical frustum is equal to or smaller than an angle defined between a conical surface of the second conical frustum relative to a base of the second conical frustum.

4. The optical plate according to claim 3, wherein the angle defined between a conical surface of the first conical frustum relative to a base of the first conical frustum or defined between a conical surface of the second conical frustum relative to a base of the second conical frustum is larger than zero, and equal to or smaller than 60 degrees.

5. The optical plate according to claim 1, wherein a diameter of a base of each conical frustum protrusion is configured to be in a range from about 0.02 millimeters to about 4 millimeters.

6. The optical plate according to claim 1, wherein a height of each conical frustum protrusion is configured to be in a range from about 0.01 millimeters to about 3 millimeters.

7. The optical plate according to claim 1, wherein the conical frustum protrusions are distributed radially in a symmetric manner with respect to the lamp-receiving portion, a diameter of a base of each of the conical frustum protrusions increases with increasing distance from the lamp-receiving portion.

8. The optical plate according to claim 1, wherein the diffusion layer comprises transparent resin matrix material, and diffusion particles dispersed in the transparent resin matrix material.

9. The optical plate according to claim 8, wherein the light diffusion layer is made of ink comprising a varnish and a plurality of diffusion particles dispersed in the varnish.

10. The optical plate according to claim 1, wherein the diffusion layer is composed of one of circular walls, square walls and circular dots.

11. The optical plate according to claim 10, wherein the diffusion layer is composed of a plurality of circular walls arranged apart; centers of the circular walls of the diffusion layer are aligned at a mid-point of the lamp-receiving portion.

12. The optical plate according to claim 10, wherein the diffusion layer is composed of a plurality of square walls arranged apart; the center of the lamp-receiving portion and the points made by the intersections of the diagonals of the square walls of the diffusion layer are collinear.

13. The optical plate according to claim 10, wherein the diffusion layer is composed of a plurality of circular dots; the circular dots are arranged radially from the lamp-receiving portion.

14. The optical plate according to claim 1, wherein the lamp-receiving portion is selected from one of blind hole and through hole communicating with the first surface and the second surface.

15. A backlight module comprising:
a housing having a base and a plurality of sidewalls extending from a periphery of the base, the base and the sidewalls cooperatively forming an opening;
at least one point light source disposed on the base, each point light source having a light-emitting portion;
at least one reflective member is positioned above the top of the light-emitting portion;
a light diffusion plate disposed on the housing over the opening; and
an optical plate positioned in the housing, the optical plate including at least one transparent plate unit having:
a first surface,
a second surface opposite to the first surface,
a plurality of conical frustum protrusions formed on the second surface; and
at least a lamp-receiving portion defined in at least one of the first surface and the second surface; and
a diffusion layer formed at the second surface, wherein the light-emitting portion of the at least one point light source is inserted in the lamp-receiving portion correspondingly.

16. The backlight module according to claim 15, further comprising a light reflective plate defining a through hole therein, the light reflective plate being disposed underneath the bottom surface of the optical plate, and the point light source passing through the light reflective plate via the through hole.

17. The backlight module according to claim 16, wherein the light reflective plate further comprises a plurality of reflective sidewalls extending from a periphery thereof and contact with the sidewalls of the housing.

18. The backlight module according to claim 15, wherein the housing is made of metal materials, and has high reflectivity inner surfaces.

19. The backlight module according to claim 15, wherein the lamp-receiving portion is selected from one of blind hole and through hole communicating with the first surface and the second surface.

20. The backlight module according to claim 15, wherein the diffusion layer is composed of one of circular walls, square walls and circular dots.

* * * * *